UNITED STATES PATENT OFFICE.

CARL JAGERSPACHER, OF BASEL, SWITZERLAND, ASSIGNOR TO SOCIETY OF CHEMICAL INDUSTRY IN BASLE, OF BASEL, SWITZERLAND.

METAL COMPOUNDS OF ORTHOOXYAZO DYESTUFFS AND A PROCESS OF MAKING SAME.

1,216,813. Specification of Letters Patent. Patented Feb. 20, 1917.

No Drawing. Application filed December 31, 1915. Serial No. 69,651.

*To all whom it may concern:*

Be it known that I, Dr. CARL JAGERSPACHER, chemist, a citizen of the Swiss Republic, and resident of Basel, Switzerland, have invented new and useful Metal Compounds of Orthooxyazo Dyestuffs and a Process of Making Same, of which the following is a full, clear, and exact specification.

In my application for U. S. Letters Patent Serial No. 69652, filed December 31, 1915, is described a process for the manufacture of new orange to red orthooxyazo dyestuffs able to be combined with chromium, consisting in combining the diazo derivatives of orthoaminophenols or of orthoaminonaphthols or of their derivates with the pyrazolone derivates of the benzene or the naphthalene series substituted by hydroxyl in the aryl-nucleus.

I have now found that these dyestuffs can be transformed into new metal compounds, soluble in water, by their treatment with convenient metal compounds, the said new metal compounds having the valuable property to dye the animal fibers in an acid bath vivid tints showing an excellent fastness to washing and to light without any subsequent treatment. Thus the transformation of the said dyestuffs into copper compounds soluble in water is effected for instance, by treating the same with copper compounds in an aqueous solution or suspension according to the process described in the United States applications for Letters Patent Ser. No. 43413, filed August 3, 1915, and Ser. No. 54503 and No. 54504, both filed October 7, 1915. Generally speaking, the new copper compounds from which the copper cannot any more be precipitated by sodium carbonate, soda lye and ammonia, separate directly from the reaction mass. If that should not be the case, their separation can be produced by addition of common salt.

Instead of starting from the achieved orthooxyazo dyestuffs and acting on their solution or suspension with copper compounds, the new copper compounds can be obtained by producing the said orthooxyazo dyestuffs in presence of copper compounds. Hereby are produced directly the heretofore specified copper compounds, which are, eventually after addition of common salt, filtered, washed and dried. The copper compounds produced according to the described process yield from acid baths on animal fibers valuable orange to brown and red dyeings showing a very good fastness to light, washing and alkalis without any subsequent treatment.

All the new metal compounds of orthooxyazo dyestuffs constitute yellow to red powders soluble in concentrated sulfuric acid to deep colored solutions and in water to yellow to red colored solutions dyeing animal fibers yellow and brown to orange and red tints fast to light, washing and alkali. As the new metal compounds contain, besides the hydroxyl group resulting from the orthooxydiazo compound, till a further group able to be combined with chromium, they allow to produce tints also fast to fulling and potting, by treating subsequently their direct dyeings with chromates or by dyeing the said metal compounds according to other processes usually employed for mordant dyestuffs.

The preparation of the new copper compounds is illustrated by the following examples:

Example 1: 23 parts of the dyestuff derived from the diazo compound of 4:2:1-nitroaminophenol and the pyrazolone corresponding to the orthoaminophenol-sulfonic acid, are dissolved in 800 parts hot water and to the thus obtained solution is added at about 70° C. a solution of 13 parts copper sulfate in 50 parts water. The red solution turns to brown and the red-brown copper compound precipitates entirely after common salt has been added. The sulfuric acid which became free is neutralized with sodium acetate, the copper compound is separated by filtration, pressed and dried. The dyestuff yields from an acid bath on animal fibers orange-brown dyeings fast to washing and light.

Example 2: To an aqueous solution of 27 parts of the methylpyrazolone derived from orthoaminophenolsulfonic acid and of 40 parts sodium carbonate is added a solution of 25 parts crystallized copper sulfate in 100 parts water. Into the thus obtained mixture is introduced hereafter the diazo derivative prepared in the known manner from 18.9 parts of orthoaminophenolsulfonic acid. After the combination has taken place the copper hydroxid in excess is separated by filtering the mass hot and from the filtered liquid the copper compound of the dyestuff is precipitated by adding common salt. It dyes wool in an acid bath brown-orange tints fast to light, washing and alkali.

In an analogous manner is effected the preparation of the copper compounds of the various other dyestuffs described in my application for U. S. Letters Patent Serial No. 69652, filed December 31, 1915.

Instead of producing the new copper compounds in substance, they can be prepared on the fiber, by treating the dyeings directly obtained with the dyestuffs of my application for U. S. Letters Patent Serial No. 69652, filed December 31, 1915, subsequently with copper salts or by dyeing with the said dyestuffs in a bath containing copper salts.

The transformation of the dyestuffs described in my application for U. S. Letters Patent executed at the same date as the present one into well defined chromium compounds is effected for instance by treating the said dyestuffs with chromium oxid salts in a hot aqueous solution or suspension till the transformation is complete and by separating the thus formed chromium compounds by salting out or by evaporation.

Instead of starting from the said dyestuffs for the preparation of the new chromium compounds, these latter can be produced also by subjecting the half chromed dyestuffs able to be prepared according to the application for U. S. Letters Patent Serial No. 64023, filed November 29, 1915, by combining the chromium derivates of orthooxydiazo compounds with oxyphenyl- or oxynaphthylpyrazolones, to a further action of chromium oxid salts.

The preparation of the chromium compounds is illustrated by the following example:

Example 3: 5 parts of the dyestuff prepared according to Example 1 of my application for U. S. Letters Patent executed at the same date as the present one with the diazo derivate of orthoaminophenolsulfonic acid and the pyrazolone derived from paranitroorthoaminophenol are dissolved in 100 parts water and to the thus obtained solution are added 12 parts crystallized sodium acetate and 5 parts chromium fluorid and the mass boiled feebly for about ¾ to 1 hour, whereby the coloration of the solution passes from yellow to orange. Hereafter the liquid is separated by filtration from small quantities of inorganic components, evaporated to the half of its volume and the new chromium compound is separated in a solid form by adding common salt to the cooled solution. It dissolves in water with red-orange coloration and from its aqueous solution it dyes animal fibers fast red-orange tints identical with those obtained by chromating subsequently the dyeings of the sodium salt of the dyestuff.

In an analogous manner can be prepared the chromium compounds of the various dyestuffs described in my application for U. S. Letters Patent Serial No. 69652, filed December 31, 1915.

In the following tabular exhibit are indicated the properties of a certain number of the metal compounds able to be prepared according to the present invention:

| Dyestuff resulting from— | | Dyeing of the copper compound on wool in an acid bath. | Dyeing of the chromium compound on wool from an acid bath. |
|---|---|---|---|
| The methyl pyrazolone derived from— | And the diazo derivate of— | | |
| Para-nitro-ortho-aminophenol. | o-Aminophenolsulfonic acid. | Orange-brown. | Red-orange. |
| Ortho-aminophenolsulfonic acid. | o-Aminophenolsulfonic acid. | Orange-brown. | Red-orange. |
| Ortho-aminophenolsulfonic acid. | Para-nitro-ortho-aminophenol. | Orange-brown. | Red-orange. |
| Ortho-aminophenolsulfonic acid. | Nitroamino-para-cresol. | Red. | Red. |
| Ortho-aminophenolsulfonic acid. | Picramic acid. | Brown. | Brown. |
| Ortho-aminophenolsulfonic acid. | 1:2:4-Amino-naphtholsulfonic acid. | Red. | Blue-red. |
| Para-chlor-ortho-aminophenol. | o-Aminophenol-sulfonic acid. | Orange-brown. | Red-orange. |
| Para-chlor-ortho-aminophenol. | Ortho-amino-para-cresol-sulfonic acid. | Brown-red. | Red. |
| Para-aminosalilyc acid. | o-Aminophenolsulfonic acid. | Orange. | Red-orange. |
| Para-aminosalilyc acid. | p-Nitro-o-amino-phenol. | Brown-orange. | Red-orange. |
| Para-aminosalilyc acid. | o-Amino-p-cresol-sulfonic acid. | Red-orange. | Red. |
| Para-aminosalilyc acid. | Nitroamino-p-cresol. | Red. | Red. |
| Para-aminosalilyc acid. | p-Chlor-o-amino-phenol. | Red-orange. | Red. |
| Para-aminosalilyc acid. | p-Chlor-o-amino-phenol-o-sulfonic acid. | Red-orange. | Red. |
| Para-aminosalilyc acid. | Picramic acid. | Brown. | Red-brown. |
| Para-aminosalilyc acid. | 1:2:4-Amino-naphtholsulfonic acid. | Blue-red. | Red. |
| 2:5:7-Amino-naphtholsulfonic acid. | o-Aminophenol-sulfonic acid. | Brown. | Brown. |
| 2:5:7-Amino-naphtholsulfonic acid. | p-Nitro-o-amino-phenol. | Brown. | Brown. |
| 2:5:7-Amino-naphtholsulfonic acid. | 1:2:4-Aminonaphtholsulfonic acid. | Red. | Blue-red. |
| 4-Sulfo-2-amino-1-phenol-6-carboxylic acid. | p-Nitro-o-amino-phenol. | Orange-brown. | Red-brown. |
| 4-Sulfo-2-amino-1-phenol-6-carboxylic acid. | Nitroamino-p-cresol. | Yellow-red. | Pure yellow-red. |

In an analogous manner can be prepared other metal compounds of the new dyestuffs as for instance the nickel, cobalt, iron or aluminum compounds which dye also animal fibers in an acid bath valuable tints of good fastness properties.

What I claim is:

1. The described process for the manufacture of new metal compounds of orthooxyazo dyestuffs, consisting in treating with metal compounds the orthooxyazo dyestuffs resulting from the combination of orthooxydiazo bodies with pyrazolone-derivates of the benzene or the naphthalene series hydroxylated in the aryl nucleus, in order to transform the said orthooxyazo dyestuffs into products containing a metal and soluble in water.

2. The described process for the manufacture of new copper compounds of orthooxyazo dyestuffs consisting in treating with copper compounds the orthooxyazo dyestuffs resulting from the combination of orthooxydiazo bodies with pyrazolone derivates of the benzene or the naphthalene series hydroxylated in the aryl nucleus, in order to convert the said orthooxyazo dyestuffs into products containing copper and soluble in water.

3. The described process for the manufacture of new copper compounds of orthooxyazo dyestuffs consisting in combining orthooxydiazo bodies with pyrazolone derivates of the benzene or the naphthalene series hydroxylated in the aryl nucleus in presence of copper compounds, in order to obtain compounds of orthooxyazo dyestuffs containing copper and soluble in water.

4. As new products, the described metal compounds of orthooxyazo dyestuffs, constituting in a dry state yellow to red powders, dissolving in concentrated sulfuric acid to deep colored solutions and in water to yellow to red colored solutions from which animal fibers are dyed yellow to brown and orange to red tints fast to light, washing and alkali and becoming also fast to fulling and potting by chromating them subsequently.

5. As new articles of manufacture, the described new copper compounds of orthooxyazo dyestuffs, constituting in dry state yellow to red powders, dissolving in concentrated sulfuric acid to deep colored solutions and in water to yellow to red solutions dyeing animal fibers yellow, brown and orange to red tints fast to light, washing and alkali and becoming also fast to fulling and potting by chromating them subsequently.

In witness whereof I have hereunto signed my name this second day of December 1915, in the presence of two subscribing witnesses.

Dr. CARL JAGERSPACHER.

Witnesses:
ARNOLD ZUBER,
AMAND RITTER.